US012711429B2

(12) United States Patent
Zhao

(10) Patent No.: US 12,711,429 B2
(45) Date of Patent: Aug. 18, 2026

(54) GENERATION AND UTILIZATION OF CHANNEL ALLOCATION MODELS FOR RESOURCE ALLOCATION RECOMMENDATIONS

(71) Applicant: Google LLC, Mountain View, CA (US)

(72) Inventor: Xinghua Zhao, Jersey City, NJ (US)

(73) Assignee: GOOGLE LLC, Mountain View, CA (US)

( * ) Notice: Subject to any disclaimer, the term of this patent is extended or adjusted under 35 U.S.C. 154(b) by 771 days.

(21) Appl. No.: 18/013,322

(22) PCT Filed: Dec. 20, 2022

(86) PCT No.: PCT/US2022/053464
§ 371 (c)(1),
(2) Date: Dec. 28, 2022

(87) PCT Pub. No.: WO2024/136847
PCT Pub. Date: Jun. 27, 2024

(65) Prior Publication Data

US 2025/0094879 A1 Mar. 20, 2025

(51) Int. Cl.
*G06N 20/20* (2019.01)
*G06N 20/10* (2019.01)

(52) U.S. Cl.
CPC ............. *G06N 20/20* (2019.01); *G06N 20/10* (2019.01)

(58) Field of Classification Search
CPC ............................... G06N 20/10; G06N 20/20
See application file for complete search history.

(56) References Cited

U.S. PATENT DOCUMENTS

2013/0138816 A1* 5/2013 Kuo ...................... G06F 9/5011 709/226
2020/0287923 A1* 9/2020 Raghavendra ......... G06N 3/044
2021/0142197 A1* 5/2021 Katz ........................ G06N 7/01
2022/0342371 A1* 10/2022 Bellay ................... G06F 18/214
2023/0102786 A1* 3/2023 Garapati ................ G06N 20/20 706/50
2024/0112012 A1* 4/2024 Soulhi ...................... G06N 3/08
2024/0135312 A1* 4/2024 Subramanian ... G06Q 10/06315

OTHER PUBLICATIONS

Zhang et al., Cellular QoE Prediction for Video Service Based on Causal Structure Learning, Apr. 2022. (Year: 2022).*

(Continued)

*Primary Examiner* — Marshall L Werner
(74) *Attorney, Agent, or Firm* — DORITY & MANNING P.A.

(57) ABSTRACT

Example embodiments of the present disclosure provide for an example method including obtaining data associated with media channels. The example method includes inputting the data into a machine learning model. The example method includes estimating, by the machine learning model, a structure of a causal graph. The example method includes applying a second machine learning model to the causal graph to estimate one or more parameters associated with the causal graph. The example method includes determining an allocation of resources to the media channels based on the causal graph.

19 Claims, 7 Drawing Sheets

(56) References Cited

OTHER PUBLICATIONS

Sahoh et al., Causal Artificial Intelligence for High-Stakes Decisions: The Design and Development of a Causal Machine Learning Model, Mar. 2022. (Year: 2022).*
Griffin, "The Big Three: A Methodology to Increase Data Science ROI by Answering the Questions Companies Care About", arXiv:2002.07069v1, Feb. 12, 2020, 43 pages.
International Search Report and Written Opinion for PCT/US2022/053464, mailed on Jun. 16, 2023, 11 pages.
Jensen et al., "Bayesian Networks and Decision Graphs", Springer, New York, New York, United States, Jun. 6, 2007, 457 pages.
Pearl, "Probabilistic Reasoning in Intelligent Systems: Networks of Plausible Inference", Morgan Kaufmann Publishers, San Francisco, California, United States, 1988, 573 pages.
Spirtes et al., "Causation, Prediction, and Search", 1993, chrome-extension://efaidnbmnnnibpcajpcglcle findmkaj/http://www.cs.cmu.edu/afs/cs.cmu.edu/project/learn-3/lib/photoz/.g/web/.g/scottd/fullbook.pdf, retrieved on Apr. 7, 2023, 546 pages.
International Preliminary Report on Patentability for Application No. PCT/US2022/053464, mailed Jul. 3, 2025, 7 pages.
Cowell et al., "Probabilistic Networks and Expert Systems", Springer-Verlag, New York, New York, United States, 1999, 38 pages.
Koller et al., "Probabilistic Graphical Models: Principles and Techniques", MIT Press, Cambridge, Massachusetts, United States, Jan. 2009, 1270 pages.
Lauritzen, "Graphical Models", Oxford University Press, New York, New York, United States, 1996, 9 pages.
Lauritzen, "Lectures on Graphical Models", University of Copenhagen, 3rd Edition, 2020, 160 pages.
Shalizi, "Graphical Models", Carnegie Mellon University, uADA Lectures, 11 pages.
Wermuth et al., "Graphical Markov Models: Overview", arXiv:1407.7783v2, May 4, 2015, 23 pages.
Chatwin, "An Overview of Computational Challenges in Online Advertising", 2013 American Control Conference (ACC), Jun. 17-19, 2013, Washington, DC, USA, pp. 5990-6007.

* cited by examiner

| Media Channel | Resource Allocation |
|---|---|
| Media Channel 1 | Allocation 1 |
| Media Channel 2 | Allocation 2 |
| Media Channel 3 | Allocation 3 |

GENERATION AND UTILIZATION OF CHANNEL ALLOCATION MODELS FOR RESOURCE ALLOCATION RECOMMENDATIONS

CROSS-REFERENCE TO RELATED APPLICATIONS

The present application is based upon and claims the right of priority under 35 U.S.C. § 371 to International Application No. PCT/US2022/053464 filed on Dec. 20, 2022, which is incorporated by reference herein.

FIELD

The present disclosure relates generally to systems and methods for determining direct and indirect relationships of media channels for use in determining future resource allocation.

BACKGROUND

Computing devices can perform data processing and run machine learning models. Users can engage in various online and offline activities which can result in exposure of information to the user. Subsequent activities by a user can be influenced by prior activity and information exposure.

SUMMARY

Aspects and advantages of embodiments of the present disclosure will be set forth in part in the following description, or can be learned from the description, or can be learned through practice of the embodiments.

In one example aspect, the present disclosure provides for an example system for generation and utilization of channel allocation models for resource allocation recommendations, including one or more processors and one or more memory device storing instructions that are executable to cause the one or more processors to perform operations. In some implementations, the one or more memory devices can include one or more transitory or non-transitory computer-readable media storing instructions that are executable to cause the one or more processors to perform operations. In the example system, the operations can include obtaining data associated with a plurality of media channels. In the example system, the operations can include inputting the data into a machine learning model. In the example system, the operations can include estimating, by the machine learning model, a structure of a causal graph. In the example system, the operations can include applying a second machine learning model to the causal graph to estimate one or more parameters associated with the causal graph. In the example system, the operations can include determining an allocation of resources to the plurality of media channels based on the causal graph.

In some embodiments of the example system, the causal graph comprises a Bayesian belief network and the second machine learning model comprises a kernel-based machine learning model.

In some embodiments of the example system, estimating, by the machine learning model, the structure of the causal graph includes performing structure learning to generate the causal graph comprising a plurality of nodes and a plurality of edges.

In some embodiments of the example system, the structure learning includes applying a machine learning model for feature selection. In some embodiments of the example system, the structure learning includes performing bootstrap aggregation for updating the causal graph.

In some embodiments of the example system, estimating the structure of the causal graph includes performing parameter learning to determine a (i) magnitude and (ii) direction for each respective edge of the plurality of edges.

In some embodiments of the example system, performing the parameter learning includes performing parameter regularization.

In some embodiments of the example system, the causal graph comprises a directed acyclic graph representing conditional probabilities between the nodes.

In some embodiments of the example system, the operations can include performing a validation method by transmitting data comprising instructions that cause a graphical representation of the causal graph to display via a graphical user interface of a device associated with a user. In some embodiments of the example system, the operations can include obtaining data indicative of user input of acceptance of the graphical representation of the causal graph.

In some embodiments of the example system, determining the allocation of resources to the plurality of media channels based on the causal graph includes determining a relationship between a first node, a second node, and a third node. In some embodiments of the example system, determining the allocation of resources to the plurality of media channels based on the causal graph includes based on the relationship between the first node, the second node, and the third node, determining an optimal budget allocation for a first media channel associated with the first node, a second medial channel associated with the second node, and a third media channel associated with the third node.

In some embodiments of the example system, the operations include determining the optimal budget allocation for the first media channel, the second media channel, and the third media channel includes simulating data indicative of a plurality of budget allocation scenarios, wherein each budget allocation scenario is indicative of an amount of budget allocated to each of the first media channel, the second media channel, and the third media channel. In some embodiments of the example system, the operations include determining the optimal budget allocation for the first media channel, the second media channel, and the third media channel includes obtaining data indicative of user input of a target parameter. In some embodiments of the example system, the operations include determining the optimal budget allocation for the first media channel, the second media channel, and the third media channel includes for each respective budget allocation scenario of the plurality of budget allocation scenarios, determining a respective parameter for a respective budget allocation scenario of the plurality of budget allocation scenarios. In some embodiments of the example system, the operations include determining the optimal budget allocation for the first media channel, the second media channel, and the third media channel includes comparing each respective parameter and the target parameter. In some embodiments of the example system, the operations include determining the optimal budget allocation for the first media channel, the second media channel, and the third media channel includes determining that a first respective parameter associated with a first budget allocation scenario is within a threshold of the target parameter. In some embodiments of the example system, the operations include determining the optimal budget allocation for the first media channel, the second media channel, and the third media channel includes in response to determining that the first respective parameter is within the threshold of the target parameter, selecting the first budget allocation scenario as an optimal budget allocation scenario.

In some embodiments of the example system, the target parameter and the respective parameters associated with each respective budget allocation scenario are indicative of a percent reduction in cost per sale.

In some embodiments of the example system, the cost per sale is determined by calculating a media spend by the respective media channel divided by unit sales driven by the respective media channel.

In some embodiments of the example system, the target parameter and the respective parameters associated with each respective budget allocation scenario are indicative of an attribution associated with an effectiveness of media channel and promotion usage on target actions.

In some embodiments of the example system, the attribution for the respective media channel is determined by calculating a unit sale driven by the respective media channel divided by overall sales.

In some embodiments of the example system, the target parameter and the respective parameters associated with each respective budget allocation scenario are an overall total media spend budget.

In some embodiments of the example system, the operations include generating data indicative of a graphical representation of the causal graph. In some embodiments of the example system, the operations include transmitting data comprising instructions that, when executed, cause the graphical representation of the causal graph to render via a graphical user interface of a user device.

In some embodiments of the example system, the operations include generating data indicative of a graphical representation of the determined allocation of resources to the plurality of media channels. In some embodiments of the example system, the operations include transmitting data comprising instructions that, when executed, cause the graphical representation of the allocation of resources to the plurality of media channels to render via a graphical user interface of a user device.

In some embodiments of the example system, the data associated with the plurality of media channels comprises outcome data, predictive variables, and control variables.

In an example aspect, the present disclosure provides for an example computer-implemented method. The example method includes obtaining data associated with a plurality of media channels. The example method includes inputting the data into a machine learning model. The example method includes estimating, by the machine learning model, a structure of a causal graph. The example method includes applying a second machine learning model to the causal graph to estimate one or more parameters associated with the causal graph. The example method includes determining an allocation of resources to the plurality of media channels based on the causal graph.

In some embodiments of the example method, the causal graph comprises a Bayesian belief network and the second machine learning model comprises a kernel-based machine learning model.

In some embodiments of the example method, estimating, by the machine learning model, the structure of the causal graph includes performing structure learning to generate the causal graph comprising a plurality of nodes and a plurality of edges.

In some embodiments of the example method, the structure learning includes applying a machine learning model for feature selection. In some embodiments of the example method, the structure learning includes performing bootstrap aggregation for updating the causal graph.

In some embodiments of the example method, estimating the structure of the causal graph includes performing parameter learning to determine a (i) magnitude and (ii) direction for each respective edge of the plurality of edges.

In some embodiments of the example method, performing the parameter learning includes performing parameter regularization.

In some embodiments of the example method, the causal graph comprises a directed acyclic graph representing conditional probabilities between the nodes.

In some embodiments of the example method, the method includes performing a validation method by transmitting data comprising instructions that cause a graphical representation of the causal graph to display via a graphical user interface of a device associated with a user. In some embodiments of the example method, the method includes obtaining data indicative of user input of acceptance of the graphical representation of the causal graph.

In some embodiments of the example method, determining the allocation of resources to the plurality of media channels based on the causal graph includes determining a relationship between a first node, a second node, and a third node. In some embodiments of the example method, determining the allocation of resources to the plurality of media channels based on the causal graph includes based on the relationship between the first node, the second node, and the third node, determining an optimal budget allocation for a first media channel associated with the first node, a second medial channel associated with the second node, and a third media channel associated with the third node.

In some embodiments of the example method, the method includes determining the optimal budget allocation for the first media channel, the second media channel, and the third media channel includes simulating data indicative of a plurality of budget allocation scenarios, wherein each budget allocation scenario is indicative of an amount of budget allocated to each of the first media channel, the second media channel, and the third media channel. In some embodiments of the example method, the method includes determining the optimal budget allocation for the first media channel, the second media channel, and the third media channel includes obtaining data indicative of user input of a target parameter. In some embodiments of the example method, the method includes determining the optimal budget allocation for the first media channel, the second media channel, and the third media channel includes for each respective budget allocation scenario of the plurality of budget allocation scenarios, determining a respective parameter for a respective budget allocation scenario of the plurality of budget allocation scenarios. In some embodiments of the example method, the method includes determining the optimal budget allocation for the first media channel, the second media channel, and the third media channel includes comparing each respective parameter and the target parameter. In some embodiments of the example method, the method includes determining the optimal budget allocation for the first media channel, the second media channel, and the third media channel includes determining that a first respective parameter associated with a first budget allocation scenario is within a threshold of the target parameter. In some embodiments of the example method, the method includes determining the optimal budget allocation for the first media channel, the second media channel, and the third media channel includes in response to determining that the first respective parameter is within the threshold of the target parameter, selecting the first budget allocation scenario as an optimal budget allocation scenario.

In some embodiments of the example method, the target parameter and the respective parameters associated with each respective budget allocation scenario are indicative of a percent reduction in cost per sale.

In some embodiments of the example method, the cost per sale is determined by calculating a media spend by the respective media channel divided by unit sales driven by the respective media channel.

In some embodiments of the example method, the target parameter and the respective parameters associated with each respective budget allocation scenario are indicative of an attribution associated with an effectiveness of media channel and promotion usage on target actions.

In some embodiments of the example method, the attribution for the respective media channel is determined by calculating a unit sale driven by the respective media channel divided by overall sales.

In some embodiments of the example method, the target parameter and the respective parameters associated with each respective budget allocation scenario are an overall total media spend budget.

In some embodiments of the example method, the method includes generating data indicative of a graphical representation of the causal graph. In some embodiments of the example method, the method includes transmitting data comprising instructions that, when executed, cause the graphical representation of the causal graph to render via a graphical user interface of a user device.

In some embodiments of the example method, the method includes generating data indicative of a graphical representation of the determined allocation of resources to the plurality of media channels. In some embodiments of the example method, the method includes transmitting data comprising instructions that, when executed, cause the graphical representation of the allocation of resources to the plurality of media channels to render via a graphical user interface of a user device.

In some embodiments of the example method, the data associated with the plurality of media channels comprises outcome data, predictive variables, and control variables.

In an example aspect, the present disclosure provides for an example transitory or non-transitory computer readable medium embodied in a computer-readable storage device and storing instructions that, when executed by a processor, cause the processor to perform operations. In the example transitory or non-transitory computer readable medium, the operations include obtaining data associated with a plurality of media channels. In the example transitory or non-transitory computer readable medium, the operations include inputting the data into a machine learning model. In the example transitory or non-transitory computer readable medium, the operations include estimating, by the machine learning model, a structure of a causal graph. In the example transitory or non-transitory computer readable medium, the operations include applying a second machine learning model to the causal graph to estimate one or more parameters associated with the causal graph. In the example transitory or non-transitory computer readable medium, the operations include determining an allocation of resources to the plurality of media channels based on the causal graph.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
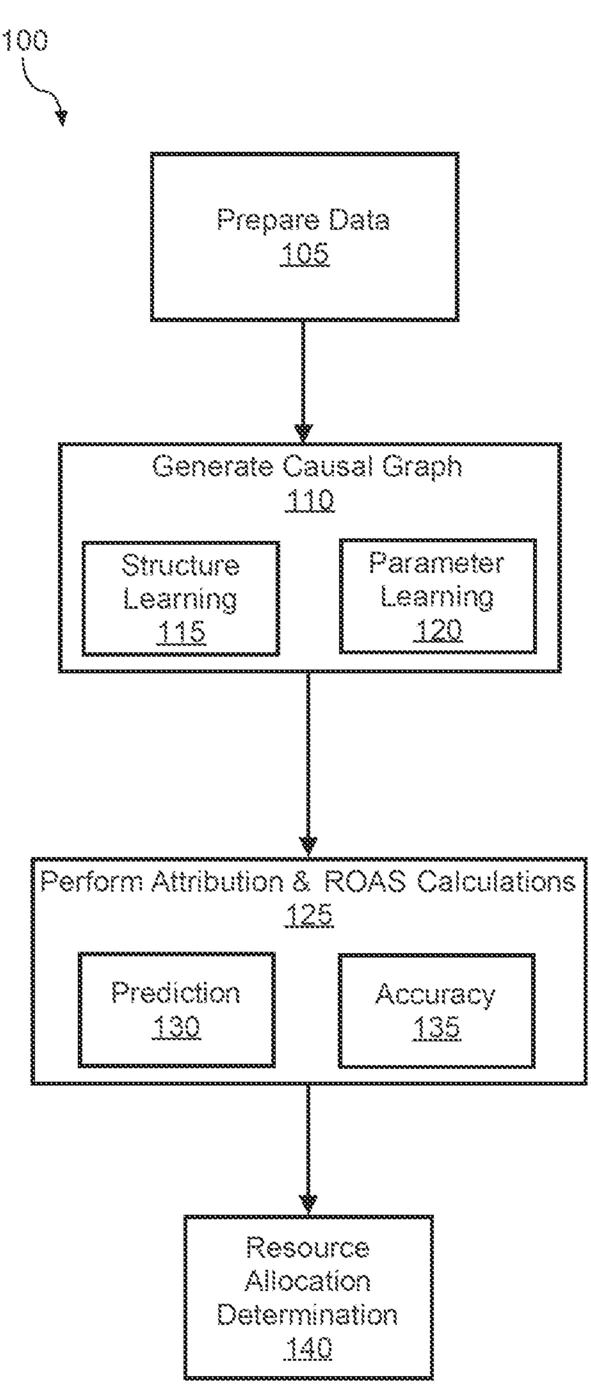
FIG. 1 depicts an example flow chart diagram of an example flow for determination of direct and indirect relationships of media channels for use in determining future resource allocation according to example embodiments of the present disclosure.

Generally, the present disclosure is directed to a channel allocation model for determining direct and indirect relationships of media channels for use in determining future resource allocation. The channel allocation model includes a machine learning approach for fitting multidimensional data for multiple media channel problems. The modeling method can include a structure learning step to identify the underlying structure and interconnected relationships of variables and a parameter learning step to update a quantitative part of the causal graph (e.g., Bayesian network) and the magnitude of impact of each variable on the outcome can be quantified. The model can be used to predict the outcome based on allocation to various media channels and can be used to optimize resource allocation to the respective channels.

Data from various media channels is complex and can be obtained in different forms. Analyzing this data to determine the efficiency of resource allocation is important for planning future resource allocation. The present disclosure utilizes a probabilistic graphical model for mathematical formalism paired with the assistance of machine-learning and optimization of algorithms to identify direct and indirect relationships between various media channels. This can allow for automated causal inference and prediction.

A Bayesian method combined with nonparametric approaches can be employed to achieve compact computation by factoring the joint distribution into local, conditional distribution for each variable given its parents (e.g., a Markov blanket). This provides for increased computation efficiency compared to commonly used Markov Chain Monte Carlo (MCMC) sampling method which is generally computationally costly.

The present method also includes determining the structure of the network (e.g., which nodes connect to which and which connection are stronger) opposed to strictly determining predictions of input-output bindings correctly as is done by Hidden Markov Model (MM), Naive Bayes, and Neural Networks (NN). This allows for a generation of a presentation for display including nonlinearities, synergies, and other interactions between media channels (or other media variables).

Traditionally, prior channel allocation methods have treated media channels (and their respective performance) in silos. However, the effect on target actions performed (e.g., conversions, sales, and the like) based on resource allocation resulting in user exposure to content items via various media forms are related. Additionally, resource allocation resulting in user exposure in various media channels' effect on conversions is typically not a bell-curve normal distribution and rather generally includes resource allocation (e.g., computing resources, network resources, bandwidth resources, spending) increases for various events (e.g., seasonal, PR events). While there are current methods which transform data and allow for missing value imputation methods, these methods result in a change to the data structure and data sets that are harder to interpret or use in various applications. Additionally, a technological problem associated with current methods is an overfitting problem due to complexity of existing models.

The present disclosure provides for a technical solution to this technical problem by building a suite of machine-learned modeling capabilities that are robust to data assumptions and easy to scale. The output of these modeling capabilities can be used to more efficiently allocate resources to improve desired target outcomes (e.g., conversions, increase in obtaining data indicative of a user selection or interaction with one or more interactive digital components, more efficient allocation of limited user interface display space, and the like). The present disclosure focuses the solution on the following key metrics: effectiveness of content item display on increasing target actions (e.g., attribution, effectiveness) and efficiency of particular media channels on increasing target actions (e.g., efficiency of resource allocation). This method allows for expediting the modeling process of media channel performance using machine learning and allows for near real-time learnings of the effect of resource allocation on target actions performed.

Example aspects of the present disclosure can provide for a number of technical effects and benefits. For instance, example aspects relate to improving a user's access to networked resources relevant to the user or the user's task or otherwise facilitating an intent of the user when operating a computing system. For instance, by determining proper resource allocation for surfacing content items (e.g., via various electronic surfaces, various media channels, etc.) to a user to provide selectable input elements to populate via a user interface of a user computing device, the computing device can provide for more efficient user-machine interface for accomplishing tasks and performing actions that may otherwise require a more complex or indirect sequence of inputs. For instance, instead of being required to access a first network resource providing an index of options, select an option for a vendor, scroll through various items from a vendor, and ultimately select a desired item, a user input element populated on the user interface can directly link to a network resource relating to a user's desired item. By learning to predict the input elements populated on a user interface based on the probability of relevance to achieving a user's task or goal, systems and methods according to the present disclosure can provide for more direct and efficient user interfaces for accomplishing particular tasks for which the user is using the computing device (e.g., target actions, conversions). In this manner, for instance, computational resources used to render multiple different interfaces to achieve a given task can be reduced (e.g., compute cycles, memory resources, electrical resources, etc.). Furthermore, the user-machine interface can be improved by providing for a more efficient and direct user interface flow for accomplishing a given task. Thus, the present disclosure can provide for a more efficient allocation of computing resources to prevent redundant data transfer or the communication of irrelevant input element items or content items to computing devices associated with users.

Additionally, the present disclosure can provide for increased user privacy based on determining global performance values for specific media channels opposed to determining performance on an individual user level. Thus, the solution can provide for the analysis of aggregate data opposed to data associated with specific users or user devices.

The systems and methods described herein can be performed in any time interval. For example, the systems and methods can be performed daily, weekly, monthly, annually, or the like. Benefits of the present disclosure include the ability to generate a causal graph (e.g., in the form of a directed acyclic graph (DAG)) representative of the relationship between various media channels even with granular (e.g., daily) data to provide insights more quickly than traditional methods. This allows for generating predictions and recommendations for marketing campaigns that have less market history and smaller spend amounts in a less computationally expensive manner. The improvements associated with the systems and methods discussed herein can be further understood with reference to the figures.

FIG. 1 depicts an example flow 100 associated with an implementation of the channel allocation model described herein. Data flow 100 can be performed by a computing system (e.g., computing system 600). Data flow 100 can be performed by a single device or across multiple devices in a computing system (e.g., computing system 600). The data flow 100 can include a data preparation phase 105. The data flow 100 can include a causal graph generation phase 110, an attribution and return on advertisement spend (ROAS) calculation phase 125, and a resource allocation determination phase 140. Each phase can include subphases. By way of example, causal graph generation phase 110 can include a structure learning phase 115 and parameter learning phase 120.

Data preparation phase 105 can include obtaining data from a plurality of sources. For example, sources can include a plurality of media channels, aggregated data, and the like. The prepared data can include unit sales (or activations), daily active users (DAU) (or other application usage data), media impressions, spend by media channel (e.g., on a weekly basis by designated market area (DMA)), non-media data (e.g., price discounts, retail fixtures, store promotion, competitive spending), retail marketing data, promotion data, data associated with historical resource allocation (e.g., one or more months of media spend), daily data (e.g., resource allocation for various media channels, sales, conversions) at a geo level (e.g., zip code, city, or DMA level), weekly data (e.g., resource allocation for various media channels, sales, conversions) at a geo level (e.g., zip code, city, or DMA level), or different media weights across different time periods (e.g., when no resources are allocated to a media channel to correspond to an expected baseline). Media channels can include, for example, digital media, search, TV, and sales. The system can input the obtained data into one or more machine learning models and obtain output.

In some implementations, the obtained data can be in a plurality of forms. Data preparation phase 105 can include a standardization method to translate the data into a form that can be input into one or more machine-learned models or statistical models as described herein.

In causal graph generation phase 110, the system can obtain prepared data as input. By way of example, a first machine learning model can be associated with structure learning phase 115 and a second machine learning model can be associated with parameter learning phase 120. In some implementations, structure learning phase 115 can include obtaining an output comprising a plurality of features that affect an outcome (e.g., conversion). In some implementations features can include media channels. The causal graph can include a plurality of nodes and a plurality of edges. The causal graph can be in the form of a Bayesian belief network.

In some implementations, parameter learning phase 120 can include obtaining an output comprising edges (e.g., with direction and magnitude) that are representative of a relationship between the plurality of features determined during structure learning phase 115. The output can be indicative of the direct and indirect relationships between marketing, non-marketing, and business performance variables to allow for automated causal inference and prediction in other phases of data flow 100. Structure learning phase 115 and parameter learning phase 120 will be described in further detail with respect to FIG. 2 (e.g., structure learning phase 215 and parameter learning phase 220).

Attribution and ROAS calculation phase 125 can include a prediction phase 130 and accuracy phase 135. Attribution and ROAS calculation phase 125 can include performing predictions of how various resource allocations to respective channels of media will affect performance or another relevant metric. For example, metrics can include Key Performance Indicators (KPIs), cost per unit sold, attribution of total sales to a respective media channel, or the like. KPIs can include sales, offline (e.g., store) activations, application usage, or foot traffic to retail locations. Attribution and ROAS calculation phase 125 will be described in further detail with respect to FIG. 2 (e.g., attribution and ROAS calculation phase 225).

Additionally, or alternatively, the accuracy of the predicted Bayesian belief network can be analyzed to help update the causal graph representative of the relationship between various features. For example, the causal graph can be in the form of a directed acyclic graph (DAG) representative of the relationship between the various features. The DAG can include nodes that represent the various variables (e.g., media channels, features, and the like) and edges that represent the relationships between the various variables (e.g., media channels, features, and the like). The edges can have direction and magnitude. The direction of the edges can indicate the direction of causal or correlational relationship between the two nodes. The magnitude of the edges can indicate the strength of the causal or correlational relationship between the two nodes.

By way of example, the causal graph (or graphical model) can represent a set of random variables and their conditional dependencies via the DAG. The graphical model structure combined with the associated parameters can define joint probability distributions over a set of nodes (e.g., variables, features, channels). Machine-learned conditional dependency can be determined which can aid in the assessment of both qualitative and quantitative measures associated with the input data.

Based on the metrics determined in attribution and ROAS calculation phase 125, data flow 100 can include resource allocation determination phase 140. The system can employ a plurality of methods to determine how to allocate future resources. For example, resources can include computational resources, financial resources, and the like.

Figure 2:
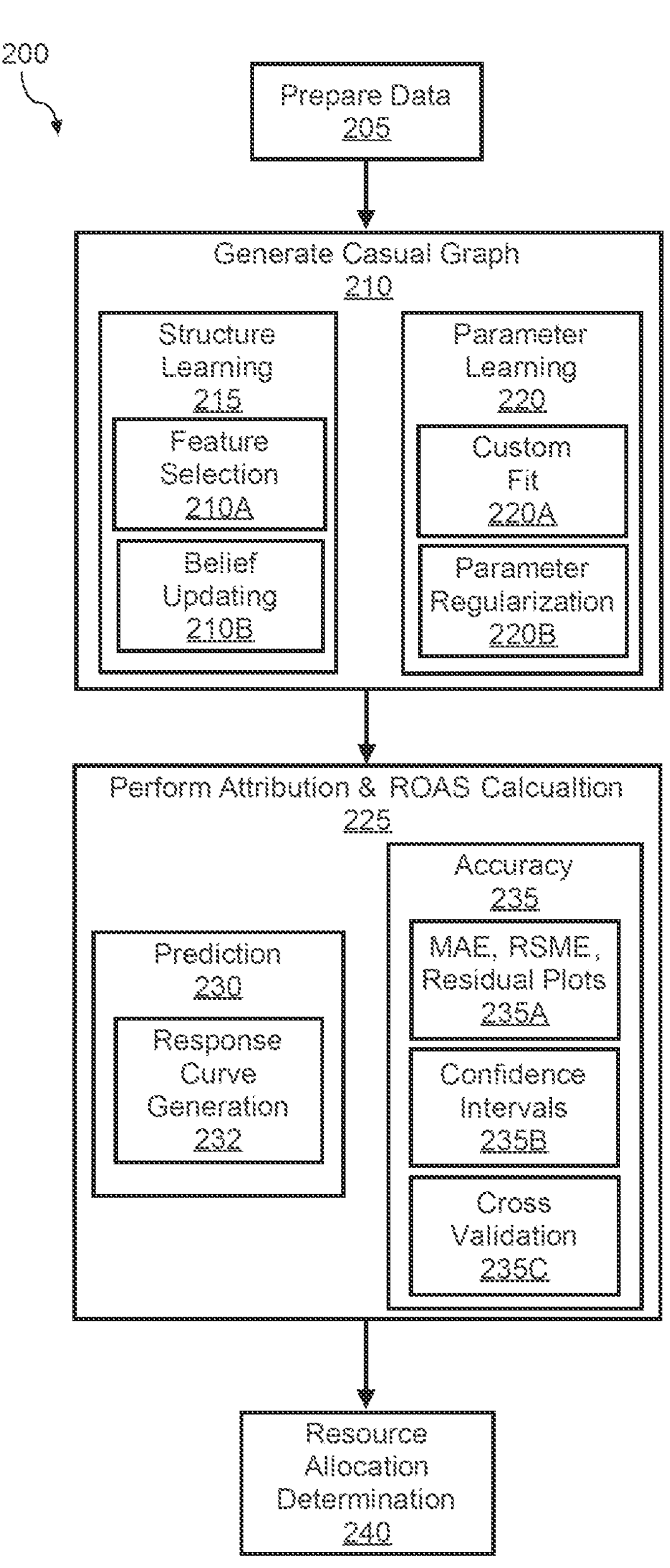
FIG. 2 depicts an example flow chart diagram of an example flow for determination of direct and indirect relationships of media channels for use in determining future resource allocation according to example embodiments of the present disclosure.

FIG. 2 depicts an example data flow 200 with more granular detail than FIG. 1. Data flow 200 can be performed by a computing system (e.g., computing system 600). Data flow 200 can be performed by a single device or across multiple devices in a computing system (e.g., computing system 600). Data flow 200 can include data preparation phase 205, causal graph generation phase 210, attribution and ROAS calculation phase 225, and resource allocation determination phase 240. Data preparation phase 205 and resource allocation determination phase 240 can generally align with data preparation phase 105 and resource allocation determination phase 140 respectively.

Causal graph generation phase 210 can include structure learning phase 215 and parameter learning phase 220. Causal graph generation phase 210 can include the use of one or more machine learning or open-source platforms that provide for data and models to be quickly processed.

In some implementations causal graph generation phase 210 can be a Bayesian belief network generation phase. Structure learning phase 215 can include feature selection 210A and belief updating 210B. In the structure learning phase 215, an underlying structure and relationship between variables can be determined. The relationships can include causal or correlational relationships.

Features selection 210A can include determining one or more features (e.g., variables, channels) to include in the structure. The system can determine the link between the respective variables to one another. In some implementations, a Tabu Search learning algorithm can be used to determine a relationship between variables. By way of example, variables can be indicative of media channels. In some implementations variables can include paid media channels, competitors, external factors, search channel, audiences, brand effect, and sales. The data flow can generate a structure comprising the variables and their respective relationships. A depiction of an example structure is described with regard to FIG. 3. In some implementations, variables can have direct and indirect effects on other variables. For example, a paid media channel can have a direct effect on sales as well as additional indirect effects on sales. By way of example, a paid media channel can have a direct effect on a search channel and a search channel can have a direct effect on sales and a brand effect channel. The brand effect channel can have a direct effect on sales. Thus, the paid media channel can have an indirect effect on sales via a direct effect on search channel, external factors, and competitors.

While describing these connections in words and/or representing the relationships in formulas representing conditional probabilities is possible from analyzing the prepared data, the present disclosure provides for generating a causal graph which can provide a visualization of the connections between the variables. This can take complex data and transform it into a form that can provide a user with a visual that is easy to understand. Additionally, the conditional probabilities and complex data analysis that is performed by the various models herein can be utilized to perform the resource allocation determination (e.g., in resource allocation determination phase 240). And this can provide for technical benefits including optimization of the display of data via a user device with limited display space.

Belief updating 210B can include updating the relationships between the respective variables based on additional processing. For example, belief updating 210B can include utilization of one or more machine learning techniques to identify variables of interest (e.g., important variables). For instance, the machine learning model can analyze data comprising a large number of variables (tens, hundreds, and the like). A causal graph comprising all of the variables could result in an unreadable graph which does not provide valuable insights. The present disclosure provides for systems and methods to determine the most relevant variables to include in the causal graph to provide for display to a user and utilize in resource allocation determination phase 240.

The machine learning techniques can include, for example, a random forest. The random forest can be a meta-estimator aggregated through model votes or averaging into a single ensemble model. In some implementations, the random forest can outperform individual decision tree's outputs. For example, decision trees can be computationally expensive to train and can carry a risk of overfitting as well as finding local optima.

In some implementations, the final causal graph (e.g., final network represented as a DAG) can be an ensemble network (e.g., model averaging) via bootstrap aggregation or bagging of hundreds of bootstrapped networks. By generating an ensemble network, a robust network can be learned with high stability.

In additional or alternative implementations, variable importance can be calculated by a random forest to be used for feature selection and to assist in favoring or penalizing the inclusion of specific relationships in the causal graph (e.g., network represented as a DAG). In some implementations, the system can obtain the final network by performing a bootstrap aggregation of over 100 or more networks to aid in statistical robustness. The bootstrap aggregation can additionally aid in confidence in the learned networks so that significant features can be robust to perturbation of the observations.

Parameter learning phase 220 can include custom fit 220A and parameter regularization 220B. Parameter learning phase 220 can include updating the quantitative part of the Bayesian network and quantification of the magnitude of the impact from each variable on the outcome.

In some implementations, the variables can be continuous variables. For continuous variables, the system can utilize a score-based hill climbing algorithm to determine a maximum score improvement (e.g., goodness-of-fit) at each step. In some implementations, mixed media marketing data can be discrete. A discrete Bayesian network for categorical data can be learned by the model that is designed to process discrete data.

In some implementations, media marketing data can include continuous variables. A Gaussian Bayesian network can be learned by the model that is designed to process continuous data. A maximum likelihood estimate, and a Bayesian posterior estimate can be available. By way of example, the computing system can determine posterior probabilities to reduce dimensionality. In some implementations, the computing system can only consider local distributions in the Bayesian Belief Network when determining the posterior probabilities.

Custom fit 220A can include estimating robust coefficients through custom fitting. Custom fitting can include, for example, penalized regression, Elastic net regression, and the like.

Parameter regularization 220B can include a more robust parameter estimation without the need for a user to manually search for different orders of interactions between variables. The robust parameter estimation can also be performed without reliance on linearity or additivity assumptions. By way of example, parameter regularization 220B can be performed using a kernel-based regularized least squares (KRLS) model. This can provide technical benefits. For example, KRLS allows minimization of overfitting, diminishing the influence of bad leverage points (e.g., outliers that are located far from the regression line), and the ability to perform regularization on small sample sizes.

The causal graph (e.g., probabilistic graph) can be learned in the form of a DAG as described herein. The DAG can be determined and empirically driven by data (and the analysis thereof) opposed to being influenced by human bias in data analysis. The structure of the DAG can correspond to a set of conditional dependence statements of variables in the model. In some implementations variables are not connected (e.g., no edge between two nodes). This lack of connection can be indicative of a conditional independence statement. Conditional independence can be indicative of a change in one variable resulting in no change of the independent variable.

Figure 3:
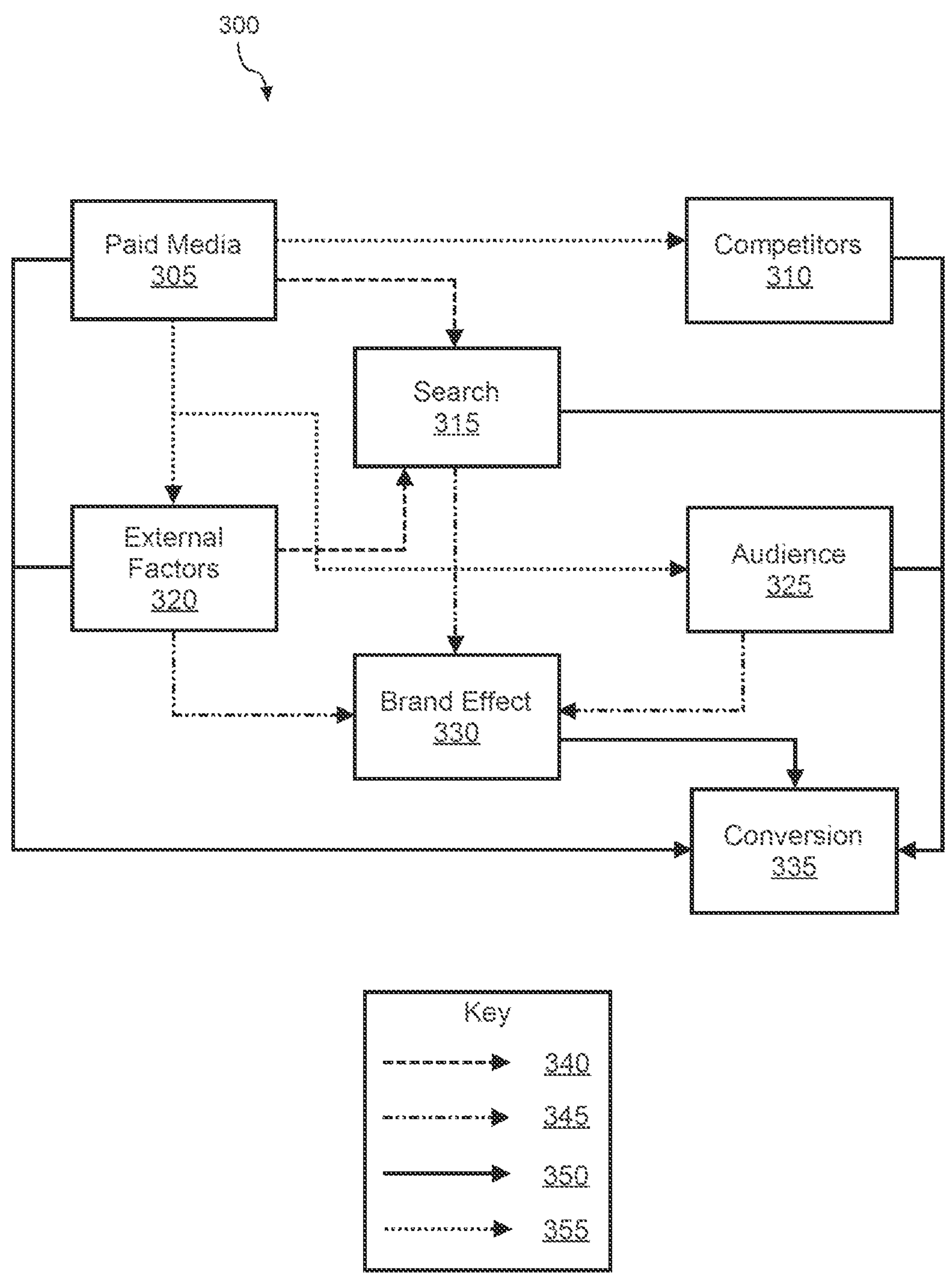
FIG. 3 depicts a block diagram of an example causal graph according to example embodiments of the present disclosure.

An example causal graph (e.g., learned network, DAG, Bayesian belief network) is depicted in FIG. 3. The various connections indicate relationships between variables which have direct impacts on other variables. For example, FIG. 3 depicts an example graphical representation 300 (e.g., visual representation) which can be provided for display via a user interface of a user device. By way of example, the graphical representation 300 can include a plurality of nodes that represent a plurality of variables. The variables can include variable 305, variable 310, variable 315, variable 320, variable 325, variable 330, and variable 335. The plurality of nodes can be connected via a plurality of edges. The plurality of edges can be divided into groups (e.g., Markov groups) that represent which variables (e.g., nodes) have a direct impact on other variables and which variables operate independent of one another. By way of example, edge groups can include edges 340, edges 345, edges 350, and edges 355.

For example, edges 340 can be associated with variables that have a direct relationship with variable 315. By way of example, variable 315 can be representative of a search channel, variable 305 can be representative of a paid media channel, and variable 320 can be representative of an external factors' variable. Edges 340 depict a direct relationship between paid media channel (e.g., variable 305) and search channel (e.g., variable 315) and a direct relationship between external factors variable (e.g., variable 320) and search channel (e.g., variable 315). By way of example, edges 340 depict a Markov blanket indicative of the variables that have a direct relationship with variable 315.

Edges 345 can be associated with variables that have a direct relationship with variable 330. For example, variable 330 can be representative of a brand effect variable and variable 325 can be representative of an audience variable. Edges 345 depict a direction relationship between external factors variable (e.g., variable 320) and brand effect variable (e.g., variable 330) and a direct relationship between audience variable (e.g., variable 325) and brand effect variable (e.g., variable 330). By way of example, edges 345 depict a Markov blanket indicative of the variables that have a direct relationship with variable 330.

Edges 350 can be associated with variables that have a direct relationship with variable 335. For example, variable 335 can be representative of a conversion variable (e.g., sales, clicks, and the like). By way of example, variable 310 can be representative of a competitor's variable. Edges 350 can represent direct relationships between paid media channel (e.g., variable 305) and conversion variable (e.g., variable 335), a direct relationship between external factors variable (e.g., variable 320) and conversion variable (e.g., variable 335), a direct relationship between competitors variable (e.g., variable 310) and sales variable (e.g., variable 335), a direct relationship between audience variable (e.g., variable 325) and sales variable (e.g., variable 335), and a direct relationship between brand effect variable (e.g., variable 330) and sales variable (e.g., variable 335). By way of example, edges 350 depict a Markov blanket indicative of the variables that have a direct relationship with variable 335.

In some implementations, the causal graph (e.g., DAG) can represent a factorization of a distribution into conditional probabilities of variables dependent on parental variables. The structure of the causal graph (e.g., DAG) can be specified in a format that recalls the decomposition into local probabilities. The structure of the causal graph (e.g., DAG) can be defined by a joint probability distribution and the order of the variables can be irrelevant.

While existing machine learning tools are typically black box, the causal graph (e.g., DAG, belief network) can allow a user to view a visual representation of how the covariates are related to one another. Therefore, the belief network can explore what the underlying structure is (e.g., which variables are connected to which and which connections are stronger). The conditional dependencies between the various nodes can be represented by the following formulas:

$$P(A \mid B) = P(B \mid A) \times \frac{P(A)}{P(B)} \quad \text{Formula 1}$$

$$P(A \mid B, C) = P(A, C) \times \frac{P(B \mid A, C)}{P(A \mid C)} \quad \text{Formula 2}$$

$$P(x_1, \ldots, x_n) = \sum_{i=1}^{n} P(x_i \mid \text{Parents}(y_i)) \quad \text{Formula 3}$$

Formula 1 represents the probability of A given B is equal to the probability of B given A times the probability of A divided by the probability of B. A, B, and C can represent various nodes (e.g., variables, media channels, and the like).

Formula 2 represents the probability of A given B and C. The probability of A given B and C equals the probability of A and C times the probability of B given A and C divided by the probability of A given C.

Formula 3 represents the probability of nodes $x_1, \ldots,$ and $x_n$. The probability of nodes $x_1, \ldots,$ and $x_n$ is equal to the sum of the probability of node $x_i$ given Parents ($y_i$) of node $x_i$ for all nodes i=1 to i=n. These formulas can be used to determine the conditional dependencies between the various nodes and their associated variables.

Turning back to FIG. 3 an example probability for a node can be represented using formulas 1-3. Thus, the probability of variable 315 given variable 305 and variable 320 can equal the probability of variable 315 and 305 times the probability of variable 320 given variable 315 and variable 305 divided by the probability of variable 315 given variable 320.

While the edges represent relationships between variables, it is important to note that the relationships do not always represent causality. The relationships can be generally concise (e.g., with limited indirect effects) and can allow for easier identification of important relationships (e.g., based on magnitudes). In some instances, the edges of the causal graph (e.g., DAG) can represent causal semantics (e.g., direct causal influences). In some implementations, in the absence of data from causal experiments, a PC algorithm can be implemented to test for persistent association between nodes in the causal graph (e.g., DAG). This can be conditioned on all subsets of other variables. In some implementations a Fast Causal Inference PC algorithm can be used to additionally account for the effects of latent variables. Additionally, or alternatively, the method can include matched market tests to be run to confirm the validity and direction of the inferred causal influences of various media channels (and other variables) on conversions (e.g., sales).

In some embodiments, the causal graph (e.g., DAG) can be provided for display via a user device. In some implementations, the computing system can obtain data indicative of user acceptance of the causal graph (e.g., DAG). For instance, a user can examine the graph and confirm that the arrows align with business sense. By way of example, a certain direction of a link can be chosen based on market intuition from media marketing practices.

In some implementations, review of the causal graph (e.g., DAG) can be automatically performed by the system. For instance, random forest results can be used to ensure that certain variables are linked (e.g., whitelisted) or prevent connection from certain variables (e.g., blacklist). By way of example, some variables can be automatically linked based on random forest results for the respective variables.

The causal graph (e.g., DAG) can be filtered to increase interpretability and simplicity of the graph. For example, results of the structure and parameter learning phases can be noisy due to limits in the data.

Quartiles of marginal effects and statistical significance of average marginal effects can be determined. The marginal effects can be indicative of the effect of heterogeneity or interactions. For instance, the pointwise marginal effects of each variable at each data point can be examined to determine where adjustment of resource allocation (e.g., adjustment of media spend) has a positive impact on one or more measured impacts (e.g., having a positive impact on driving sales) and what level of resource allocation has a negative coefficient (e.g., no positive impact) due to an under allocation or resources or excessive impressions being wasted from overspending.

Returning to FIG. 2, the causal graph (e.g., DAG) that is generated in causal graph generation phase 210 can be used by the system to perform attribution and ROAS calculation during attribution and ROAS calculation phase 225. Attribution and ROAS calculation phase 225 can include prediction phase 230 and accuracy phase 235. Prediction phase 230 can include response curve generation 232. Accuracy phase 235 can include mean absolute error (MAE), root mean square error (RSME), Residual Plots 235A, Confidence intervals 235B, and cross validation 235C.

Figure 5:
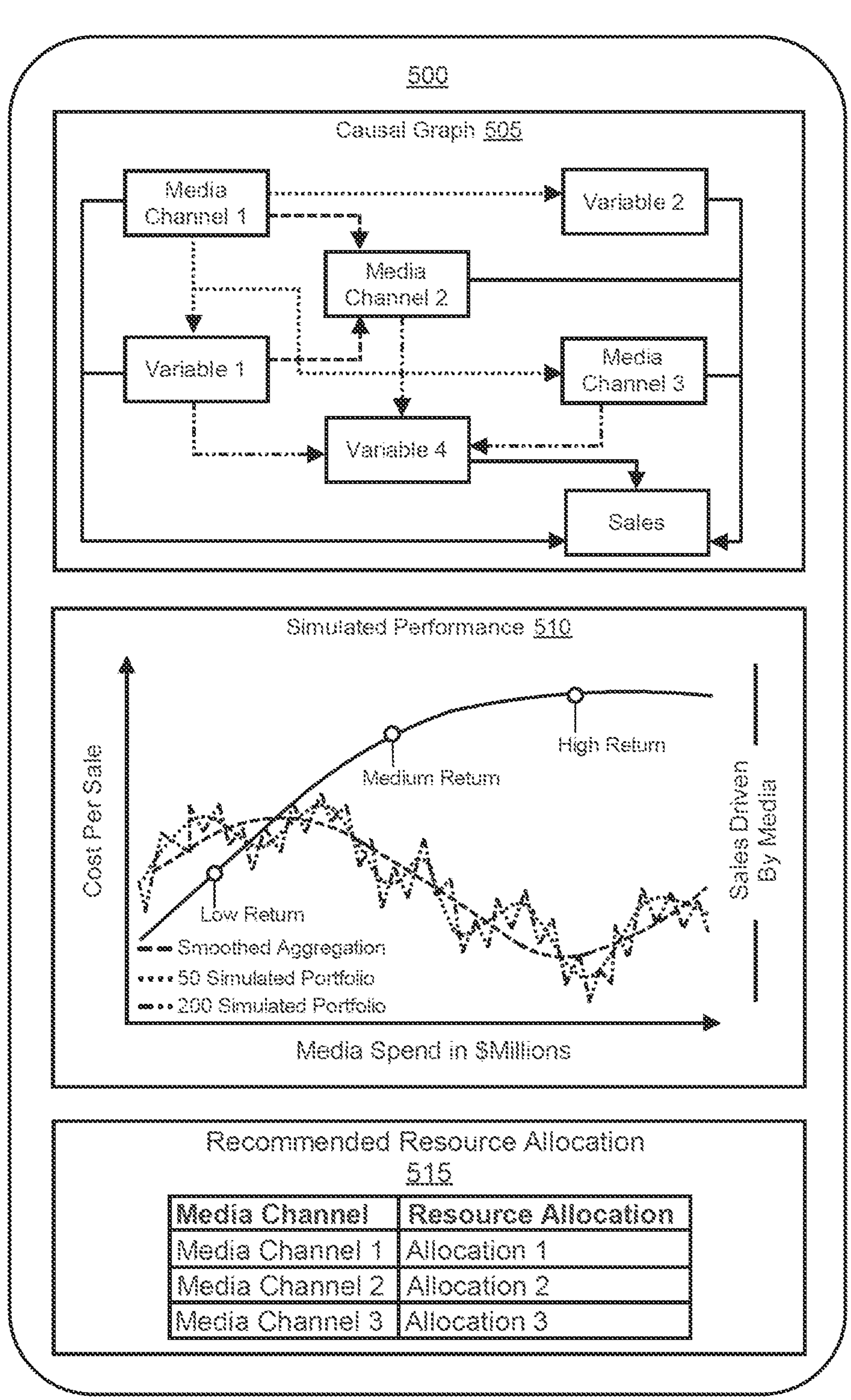
FIG. 5 depicts an example user interface according to example embodiments of the present disclosure.

For example, response curve generation 232 can include generating a plurality of curves comprising predicted performance (e.g., as depicted in FIG. 5). In some implementations, a response curve can include a simulated performance (e.g., simulated performance 510). For example, the response curve can be a graphical depiction of predicted performance including media spend on an x-axis and cost per sale on a y-axis. A simulated portfolio performance curve can be generated for portfolios of various sizes. For example, a 50 simulated portfolio curve and 200 simulated portfolio curve can be generated and displayed. Additionally, the simulated portfolios can be aggregated and smoothed to generate a smoothed aggregation curve to be displayed. One or more calculations can be performed by the system to determine a "sales driven by media" curve. The sales driven by media curve can display data indicative of a low return, medium return, and high return on sales driven by media. The data driving this visualization can be used to optimize for target parameters. Target parameters can include total media spend across the available media channels, cost per sale, and the like.

The utilization of machine learning models can allow for measuring performance across all campaigns and channels of a product area, how different media channels and activities interact with one another, and how the media channels and activities work together. This allows for improvements over existing methods which generally consider media channels (and their associated performance) in silos. Thus, using the systems and methods described herein, learning from the underlying data structure and the interrelationships between the various channels can be used to determine resource allocation. By way of example determining resource allocation can include optimization of budgets for future media channel spend. In some implementations, the method can include generating hundreds of planning scenarios through simulation based on the learned data structure (e.g., as depicted in FIG. 3). From the simulation, the method can determine a low return, medium return, and high return point to enable better future resource allocation to meet specific optimization goals. For example, optimization goals can be goals associated with target parameters, particular features, or different budget levels.

The prediction phase 230 and accuracy phase 235 of the attributions and ROAS can be used in the resource allocation determination phase 240 to determine how to allocate future resources. By way of example, resource allocation can include the distribution or allocation of computing resources or financial resources.

The causal graphs (e.g., DAGs) can be used for a variety of purposes. In some implementations, the graphs can be provided for display via a user device. This display can be used to help a user understand the impact and interrelationship of various variables (e.g., media channels, features). This relationship can be indicative of a plurality of conditional probabilities of various variables (e.g., media channels, graph nodes, features). In some implementations, the system can extract information about the conditional probabilities of the various features. In some implementations, the graph can be provided for display to a user via a display on a user device. In some implementations, a user can provide input via a user device. By way of example, the computing system can obtain data indicative of user input. For instance, user input can be indicative of acceptance of the graph. In some implementations, user input can be indicative of rejection of a portion (or all) of the graph.

Figure 4A:
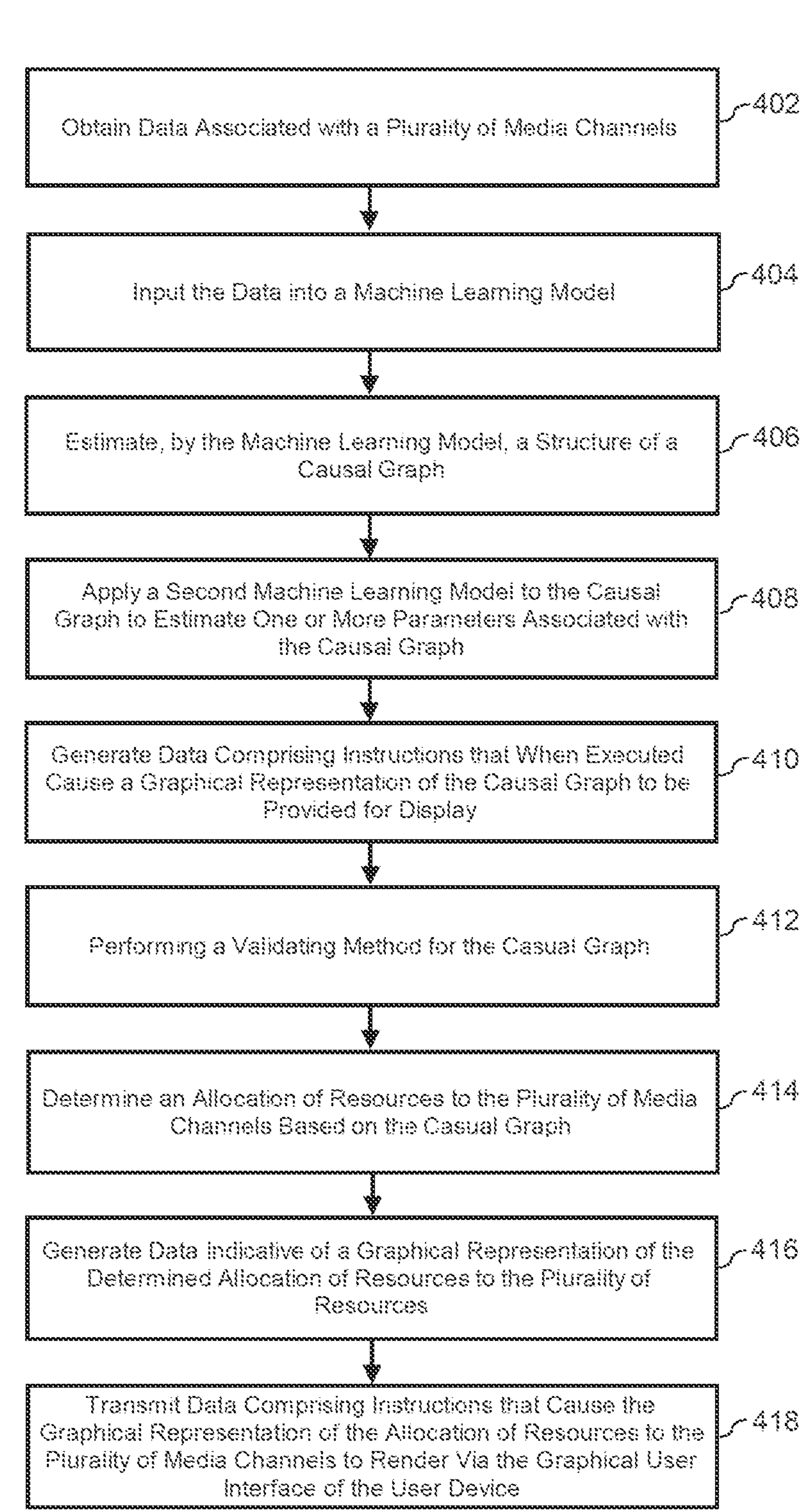
FIG. 4A-4B depict a flow chart diagram of an example method to perform determination of direct and indirect relationships of media channels for use in determining future resource allocation according to example embodiments of the present disclosure.
Figure 4B:
Figure 4B:
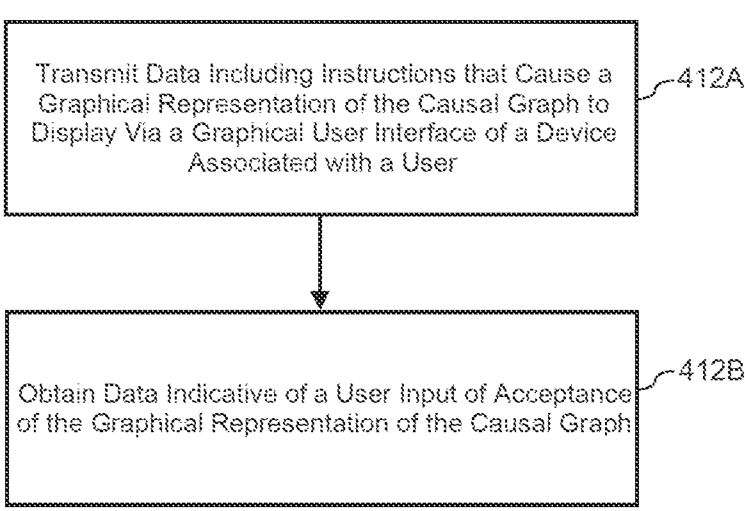

FIG. 4A-FIG. 4B depict flow chart diagrams of an example method 400 for determining direct and indirect relationships of media channels for use in determining future resource allocation. Although FIG. 4A-FIG. 4B depict steps performed in a particular order for purposes of illustration and discussion, the methods of the present disclosure are not limited to the particularly illustrated order or arrangement. The various steps of method 400 can be omitted, rearranged, combined, or adapted in various ways without deviating from the scope of the present disclosure.

At (402), method 400 can include obtaining data associated with a plurality of media channels. For instance, a computing system (e.g., computing system 600) can obtain data associated with a plurality of media channels. As described herein, the data associated with a plurality of media channels includes outcome data, predictive variables, and control variables. By way of example data can include unit sales (or activations), daily active users (DAU) (or other application usage data), media impressions, spend by media channel (e.g., on a weekly basis by designated market area (DMA)), non-media data (e.g., price discounts, retail fixtures, store promotion, competitive spending), retail marketing data, promotion data, data associated with historical resource allocation (e.g., one or more months of media spend), daily data (e.g., resource allocation for various media channels, sales, conversions) at a geo level (e.g., zip code, city, or DMA level), weekly data (e.g., resource allocation for various media channels, sales, conversions) at a geo level (e.g., zip code, city, or DMA level), or different media weights across different time periods (e.g., when no resources are allocated to a media channel to correspond to an expected baseline). Media channels can include, for example, digital media, search, TV, and sales.

At (404), method 400 can include inputting the data into a machine learning model. For instance, a computing system (e.g., computing system 600) can input the data into a machine learning model. As described herein, the machine learning model can be a single machine learning model or an ensemble of machine learning models. In some implementations, an ensemble of machine learning models can include the same type of models. In some implementations, an ensemble of machine learning models can include a diverse arrangement of model types.

At (406), method 400 can include estimating a structure of a causal graph. For instance, a computing system (e.g., computing system 600) can estimate a structure of a causal graph. As described herein, the causal graph can be estimated by the machine learning model. By way of example, the causal graph can include a Bayesian belief network. In some implementations, the causal graph can include a direct acyclic graph.

In some implementations, estimating the structure of the causal graph can include performing a structure learning to generate the causal graph comprising a plurality of nodes and edges. The structure learning can include applying a machine learning model for feature selection. The structure learning can include performing bootstrap aggregation for updating the causal graph.

In some embodiments, estimating the structure of the causal graph includes performing parameter learning to determine a (i) magnitude and (ii) direction for each respective edge of the plurality of edges. Performing parameter learning can include performing parameter regularization. The causal graph can include a directed acyclic graph representing conditional probabilities between the nodes.

At (408), method 400 can include applying a second machine learning model to the causal graph to estimate one or more parameters associated with the causal graph. For instance, a computing system (e.g., computing system 600) can apply a second machine learning model to the causal graph to estimate one or more parameters associated with the causal graph. In some implementations, the second machine learning model can be a kernel-based machine learning model. For instance, the kernel-based machine learning model can be a kernel-based regularized least squares regression model.

At (410), method 400 can include generating data indicative of a graphical representation of the causal graph. For instance, a computing system (e.g., computing system 600) can generate data indicative of a graphical representation of the causal graph.

At (412), method 400 can include performing a validation method. For instance, a computing system (e.g., computing system 600) can perform a validation method. Turning to FIG. 4B, performing a validation method can include step 412A and step 412B.

At (412A), the validation method can be performed by transmitting data comprising instructions that cause a graphical representation of the causal graph to display via a graphical user interface of a device associated with a user. For instance, a computing system (e.g., computing system 600) can transmit data comprising instructions that cause the graphical representation of the causal graph to render via a graphical user interface of a device associated with a user (e.g., as depicted in FIG. 5). For example, method 400 can include transmitting data comprising instructions that cause a graphical representation of the causal graph to display via a graphical user interface of a device associated with a user.

At (412B), the validation method can be performed by obtaining data indicative of user input of acceptance of the graphical representation of the causal graph. For instance, a computing system (e.g., computing system 600) can obtain data indicative of user input of acceptance of the graphical representation of the causal graph. For example, method 400 can include obtaining data indicative of user input of acceptance of the graphical representation of the causal graph.

At (414), method 400 can include determining an allocation of resources to the plurality of media channels based on the causal graph. For instance, a computing system (e.g., computing system 600) can determine an allocation of resources to the plurality of media channels based on the causal graph. As described herein, determining the allocation of resources to the plurality of media channels based on the causal graph can include determining a relationship between a first node, a second node, and a third node. Based on the relationship between the first node, the second node, and the third node, determining the allocation of resources to the plurality of media channels based on the causal graph can include determining the optimal budget allocation for a first media channel associated with a first node, a second medial channel associated with the second node, and a third media channel associated with the third node. This can be performed for any number nodes.

Determining the optimal budget allocation for the first media channel, the second media channel, and the third media channel can include simulating data indicative of a plurality of budget allocation scenarios (e.g., as depicted in FIG. 5), wherein each budget allocation scenario is indicative of an amount of budget allocated to each of the first media channel, the second media channel, and the third media channel. Determining the optimal budget allocation for the first media channel, the second media channel, and the third media channel can include obtaining data indicative of user input of a target parameter. Determining the optimal budget allocation for the first media channel, the second media channel, and the third media channel can include for each respective budget allocation scenario of the plurality of budget allocation scenarios, determining a respective parameter for a respective budget allocation scenario of the plurality of budget allocation scenarios. Determining the optimal budget allocation for the first media channel, the second media channel, and the third media channel can include comparing each respective parameter and the target parameter. Determining the optimal budget allocation for the first media channel, the second media channel, and the third media channel can include determining that a first respective parameter associated with a first budget allocation scenario is within a threshold of the target parameter. Determining the optimal budget allocation for the first media channel, the second media channel, and the third media channel can be included in response to determining that the first respective parameter is within a threshold of the target parameter, selecting the first budget allocation scenario as the optimal budget allocation scenario. By way of example, the target parameter and the respective parameters can be indicative of a percent reduction in cost per sale. In some implementations, the target parameter and the respective parameters can be indicative of an overall total media spend budget.

In some implementations, the target parameter and the respective parameters associated with each respective budget allocation scenario are indicative of a percent reduction in cost per sale. In some implementations, the cost per sale is determined by calculating a media spend by the respective media channel divided by unit sales driven by the respective media channel. In some implementations, the target parameter and the respective parameters associated with each respective budget allocation scenario are indicative of an attribution associated with an effectiveness of media channel and promotion usage on target actions. In some implementations, the attribution for the respective media channel is determined by calculating a unit sales driven by the respective media channel divided by overall sales.

At (416), method 400 can include generating data indicative of a graphical representation of the determined allocation of resources to the plurality of media channels. For instance, a computing system (e.g., computing system 600) can generate data indicative of a graphical representation of the determined allocation of resources to the plurality of media channels. A graphical representation of the determined allocation of resources to the plurality of media channels is described with respect to FIG. 5.

At (418), method 400 can include transmitting data comprising instructions that, when executed, cause the graphical representation of the allocation of resources to the plurality of media channels to render via the graphical user interface of the user device (e.g., as depicted in FIG. 5). For instance, a computing system (e.g., computing system 600) can transmit data comprising instructions that, when executed, cause the graphical representation of the allocation of resources to the plurality of media channels to render via the graphical user interface of the user device.

As described herein, the systems and methods can provide for transmission of data comprising instructions that cause display of various data to be rendered via a user interface of one or more devices associated with a user. FIG. 5 depicts an example graphical user interface 500. Graphical user interface 500 can represent a dashboard provided to a user associated with an online service (e.g., for generating, serving, or analyzing performance of content items displayed to third parties). Graphical user interface 500 can include a visualization of causal graph 505, a visualization of simulated performance 510, a recommended resource allocation 515.

As described herein, a computing system (e.g., computing system 600) can transmit data comprising instructions. A client device can receive the instructions and execute the instructions. The execution of the instructions can cause causal graph 505, simulated performance 510, or recommended resource allocation 515 to be displayed via a user interface (e.g., graphical user interface 500) of a device associated with a user.

FIG. 5 depicts an example user interface rendering for example purposes only and is not meant to limit the manner in which this information can be depicted via a user interface on a device associated with a user. In some implementations, the display can include audio display, visual display, or a combination of audio and visual display. In some implementations, graphical user interface 500 can include one or more selectable components to obtain data indicative of user input (e.g., as described in FIG. 6).

Figure 6:
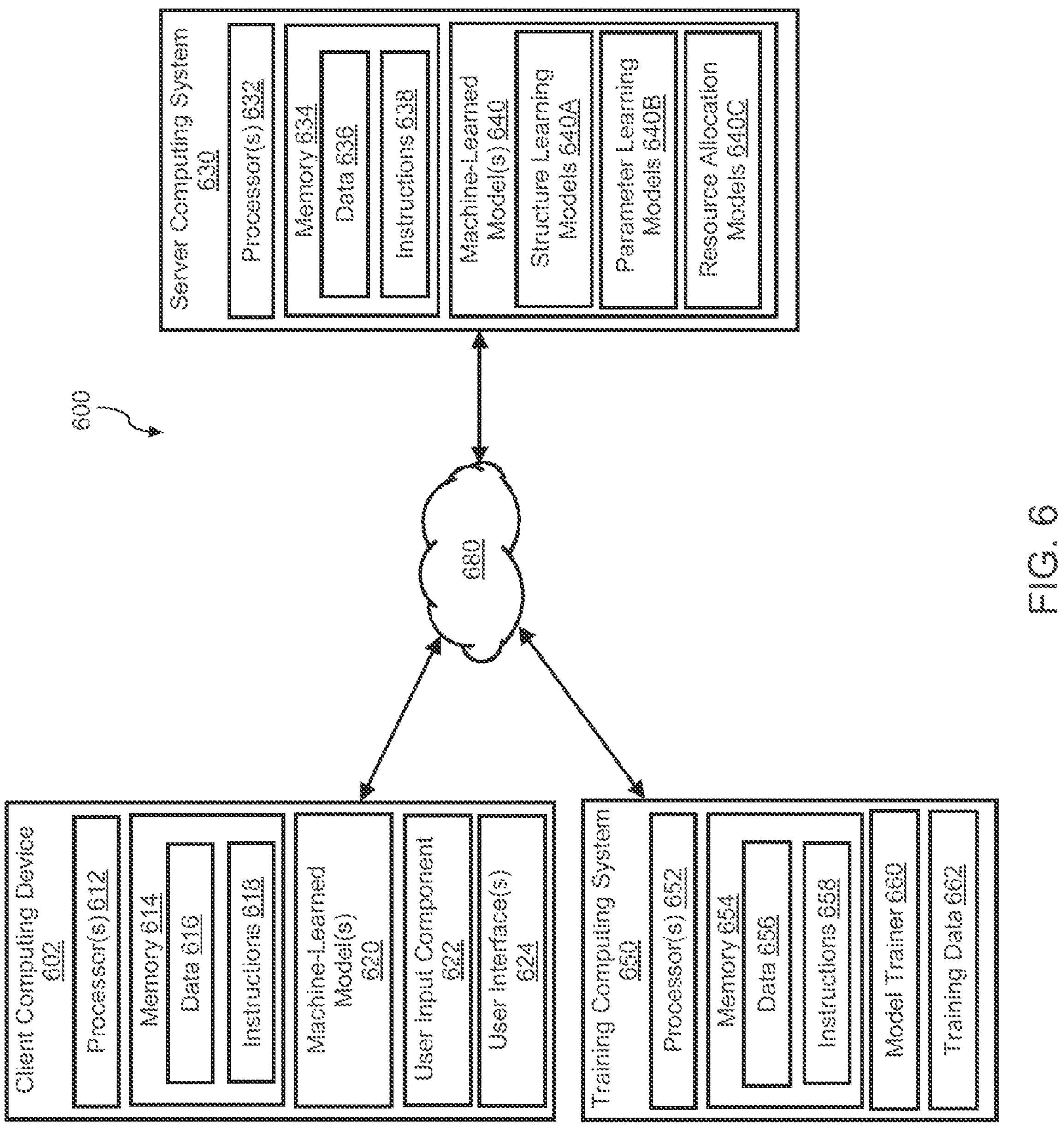
FIG. 6 block diagram of an example computing system that performs determination of direct and indirect relationships of media channels for use in determining future resource allocation according to example embodiments of the present disclosure.

FIG. 6 depicts a block diagram of an example computing system 600 that performs a determination of direct and indirect relationships of media channels for use in determining future resource allocation according to example embodiments of the present disclosure. The computing system 600 includes a user computing system 602, a server computing system 630, and a training computing system 650 that are communicatively coupled over a network 680.

The user computing system 602 can include a user device. A user device can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 602 includes one or more processors 612 and a memory 614. The one or more processors 612 can be any suitable processing device (e.g., a processor core, a microprocessor, an ASIC, an FPGA, a controller, a microcontroller, and the like) and can be one processor or a plurality of processors that are operatively connected. The memory 614 can include one or more transitory or non-transitory computer-readable storage media, such as RAM, ROM, EEPROM, EPROM, flash memory devices, magnetic disks, and the like, and combinations thereof. The memory 614 can store data 616 and instructions 618 which are executed by the processor 612 to cause the user computing system 602 to perform operations.

In some implementations, the user computing system 602 can store or include one or more machine-learned models 620. For example, the machine-learned models 620 can be or can otherwise include various machine-learned models such as Bayesian belief networks, kernel-based regularized least squares regression. Bayesian belief networks can include probabilistic graphical models comprising nodes and directed edges and learned from data. Kernel-based regularized least square regression can include non-linear regression estimation. In some implementations machine-learned models 620 can be or can otherwise include neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models). Example machine-learned models 620 are discussed with reference to FIG. 1 and FIG. 2.

In some implementations, the one or more machine-learned models 620 can be received from the server computing system 630 over network 680, stored in the user computing device memory 614, and then used or otherwise implemented by the one or more processors 612. In some implementations, the user computing system 602 can implement multiple parallel instances of a single machine-learned model 620 (e.g., to perform parallel learning across multiple instances of causal graph generation).

More particularly, the overall model can include a suite of machine-learned modeling capabilities that are robust to data assumptions and easy to scale. The machine-learned modeling capabilities can determine a structure of a network (e.g., Bayesian belief network) and utilize the network for resource allocation determination. The output of the modeling capabilities can be used to more efficiently allocate resources to improve desired target outcomes. The machined learned models can be used for expediting the modeling process of media channel performance and allow for near real-time learnings of the effect of resource allocation on target actions performed.

Additionally or alternatively, one or more machine-learned models 640 can be included in or otherwise stored and implemented by the server computing system 630 that communicates with the user computing system 602 according to a client-server relationship. For example, the machine-learned models 640 can be implemented by the server computing system 630 as a portion of a web service (e.g., a marketing service). Thus, one or more models 620 can be stored and implemented at the user computing system 602 and/or one or more models 640 can be stored and implemented at the server computing system 630.

The user computing system 602 can also include one or more user input components 622 that receives user input. For example, the user input component 622 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

User computing system 602 can include one or more user interface(s) 624. For example user interface(s) 624 can include graphical user interfaces, audio user interfaces, command line interfaces, menu-driven user interfaces, touch user interface, voice user interface, form-based user interface, or natural language user interfaces.

The server computing system 630 includes one or more processors 632 and a memory 634. The one or more processors 632 can be any suitable processing device (e.g., a processor core, a microprocessor, an ASIC, an FPGA, a controller, a microcontroller, and the like) and can be one processor or a plurality of processors that are operatively connected. The memory 634 can include one or more transitory or non-transitory computer-readable storage media, such as RAM, ROM, EEPROM, EPROM, flash memory devices, magnetic disks, and the like, and combinations thereof. The memory 634 can store data 636 and instructions 638 which are executed by the processor 632 to cause the server computing system 630 to perform operations.

In some implementations, the server computing system 630 includes or is otherwise implemented by one or more server computing devices. In instances in which the server computing system 630 includes plural server computing devices, such server computing devices can operate according to sequential computing architectures, parallel computing architectures, or some combination thereof.

As described above, the server computing system 630 can store or otherwise include one or more machine-learned models 640. For example, the models 640 can be or can otherwise include various machine-learned models. Machine-learned models 640 can include, for example, one or more structure learning models 640A, one or more parameter learning models 640B, or one or more resource allocation models 640C. Example machine-learned models include can be or can otherwise include various machine-learned models such as Bayesian belief networks, kernel-based regularized least squares regression. Bayesian belief networks can include probabilistic graphical models comprising nodes and directed edges and learned from data. Kernel-based regularized least square regression can include non-linear regression estimation. In some implementations machine-learned models 640 can be or can otherwise include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models). Example models 640 are discussed with reference to FIG. 1 and FIG. 2.

The user computing system 602 and/or the server computing system 630 can train the models 620 and/or 640 via interaction with the training computing system 650 that is communicatively coupled over the network 680. The training computing system 650 can be separate from the server computing system 630 or can be a portion of the server computing system 630.

The training computing system 650 includes one or more processors 652 and a memory 654. The one or more processors 652 can be any suitable processing device (e.g., a processor core, a microprocessor, an ASIC, an FPGA, a controller, a microcontroller, and the like) and can be one processor or a plurality of processors that are operatively connected. The memory 654 can include one or more transitory or non-transitory computer-readable storage media, such as RAM, ROM, EEPROM, EPROM, flash memory devices, magnetic disks, and the like, and combinations thereof. The memory 654 can store data 656 and instructions 658 which are executed by the processor 652 to cause the training computing system 650 to perform operations. In some implementations, the training computing system 650 includes or is otherwise implemented by one or more server computing devices.

The training computing system 650 can include a model trainer 660 that trains the machine-learned models 620 and/or 640 stored at the user computing system 602 and/or the server computing system 630 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 660 can perform a number of generalization techniques (e.g., weight decays, dropouts, and the like) to improve the generalization capability of the models being trained.

In particular, the model trainer 660 can train the machine-learned models 620 and/or 640 based on a set of training data 662. The training data 662 can include, for example, data associated with historical resource allocation (e.g., one or more months of media spend), daily data (e.g., resource allocation for various media channels, sales, conversions) at a geo level (e.g., zip code, city, or DMA level), weekly data (e.g., resource allocation for various media channels, sales, conversions) at a geo level (e.g., zip code, city, or DMA level), or different media weights across different time periods (e.g., when no resources are allocated to a media channel to correspond to an expected baseline). Media channels can include, for example, digital media, search, TV, and sales.

In some implementations, if the user has provided consent, the training examples can be provided by the user computing system 602. Thus, in such implementations, the model(s) 620 provided to the user computing system 602 can be trained by the training computing system 650 on user-specific data received from the user computing system 602. In some instances, this process can be referred to as personalizing the model.

The model trainer 660 includes computer logic utilized to provide desired functionality. The model trainer 660 can be implemented in hardware, firmware, and/or software controlling a general purpose processor. For example, in some implementations, the model trainer 660 includes program files stored on a storage device, loaded into a memory and executed by one or more processors. In other implementations, the model trainer 660 includes one or more sets of computer-executable instructions that are stored in a tangible computer-readable storage medium such as RAM, hard disk, or optical or magnetic media.

The network 680 can be any type of communications network, such as a local area network (e.g., intranet), wide area network (e.g., Internet), or some combination thereof and can include any number of wired or wireless links. In general, communication over the network 680 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be statistical data. Statistical data can be, represent, or otherwise include data computed and/or calculated from some other data source. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, and the like). As another example, the machine-learned model(s) can process the text or natural language data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

FIG. 6 illustrates one example computing system that can be used to implement the present disclosure. Other computing systems can be used as well. For example, in some implementations, the user computing system 602 can include the model trainer 660 and the training data 662. In such implementations, the models 620 can be both trained and used locally at the user computing system 602. In some of such implementations, the user computing system 602 can implement the model trainer 660 to personalize the models 620 based on user-specific data.

The technology discussed herein makes reference to servers, databases, software applications, and other computer-based systems, as well as actions taken, and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure covers such alterations, variations, and equivalents.

The depicted and/or described steps are merely illustrative and can be omitted, combined, and/or performed in an order other than that depicted and/or described; the numbering of depicted steps is merely for ease of reference and does not imply any particular ordering is necessary or preferred.

The functions and/or steps described herein can be embodied in computer-usable data and/or computer-executable instructions, executed by one or more computers and/or other devices to perform one or more functions described herein. Generally, such data and/or instructions include routines, programs, objects, components, data structures, or the like that perform particular tasks and/or implement particular data types when executed by one or more processors in a computer and/or other data-processing device. The computer-executable instructions can be stored on a computer-readable medium such as a hard disk, optical disk, removable storage media, solid-state memory, read-only memory (ROM), random-access memory (RAM), or the like. As will be appreciated, the functionality of such instructions can be combined and/or distributed as desired. In addition, the functionality can be embodied in whole or in part in firmware and/or hardware equivalents, such as integrated circuits, application-specific integrated circuits (ASICs), field-programmable gate arrays (FPGAs), or the like. Particular data structures can be used to implement one or more aspects of the disclosure more effectively, and such data structures are contemplated to be within the scope of computer-executable instructions and/or computer-usable data described herein.

Although not required, one of ordinary skill in the art will appreciate that various aspects described herein can be embodied as a method, system, apparatus, and/or one or more computer-readable media storing computer-executable instructions. Accordingly, aspects can take the form of an entirely hardware embodiment, an entirely software embodiment, an entirely firmware embodiment, and/or an embodiment combining software, hardware, and/or firmware aspects in any combination.

As described herein, the various methods and acts can be operative across one or more computing devices and/or networks. The functionality can be distributed in any manner or can be located in a single computing device (e.g., server, client computer, user device, or the like).

Aspects of the disclosure have been described in terms of illustrative embodiments thereof. Numerous other embodiments, modifications, and/or variations within the scope and spirit of the appended claims can occur to persons of ordinary skill in the art from a review of this disclosure. For example, one or ordinary skill in the art can appreciate that the steps depicted and/or described can be performed in other than the recited order and/or that one or more illustrated steps can be optional and/or combined. Any and all features in the following claims can be combined and/or rearranged in any way possible.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and/or equivalents to such embodiments. Accordingly, the subject disclosure does not preclude inclusion of such modifications, variations, and/or additions to the present subject matter as would be readily apparent to one of ordinary skill in the art. For instance, features illustrated and/or described as part of one embodiment can be used with another embodiment to yield a still further embodiment. Thus, it is intended that the present disclosure covers such alterations, variations, and/or equivalents.

What is claimed is:

1. A computer-implemented method comprising:

obtaining data associated with a plurality of media channels;

inputting the data into a machine learning model;

estimating, by the machine learning model, a structure of a causal graph comprising a Bayesian belief network (BBN) by:

performing structure learning to generate the causal graph comprising a plurality of nodes and a plurality of edges by calculating, by a random forest, a variable importance for the plurality of nodes to assist in refining the structure of the causal graph to favor an inclusion of a first set of relationships between a first set of the plurality of nodes and disfavor an inclusion of a second set of relationships between a second set of the plurality of nodes;

applying a second machine learning model to the causal graph to estimate one or more parameters associated with the causal graph;

determining an allocation of resources to the plurality of media channels based on the causal graph by:

generating a plurality of simulations for a plurality of budget allocation scenarios based on the causal graph comprising the BBN;

determining, for each respective simulation of the plurality of simulations, a parameter; and determining, based on the parameter for each respective simulation of the plurality of simulations compared to a target parameter, an optimal budget allocation; and allocating the resources to the plurality of media channels based on the determined resource allocation, wherein the resources comprise at least one of: network resources or computing resources.

2. The method of claim 1, wherein the second machine learning model comprises a kernel-based machine learning model.

3. The method of claim 1, wherein the structure learning comprises:

applying a machine learning model for feature selection; and performing bootstrap aggregation for updating the causal graph.

4. The method of claim 1, wherein estimating the structure of the causal graph comprises: performing parameter learning to determine a (i) magnitude and (ii) direction for each respective edge of the plurality of edges.

5. The method of claim 4, wherein performing the parameter learning comprises:

performing parameter regularization.

6. The method of claim 1, wherein the causal graph comprises a directed acyclic graph representing conditional probabilities between the nodes.

7. The method of claim 1, comprising performing a validation method by:

transmitting data comprising instructions that cause a graphical representation of the causal graph to display via a graphical user interface of a device associated with a user; and obtaining data indicative of user input of acceptance of the graphical representation of the causal graph.

8. The method of claim 1, wherein determining the allocation of resources to the plurality of media channels based on the causal graph comprises:

determining a relationship between a first node, a second node, and a third node; and based on the relationship between the first node, the second node, and the third node, determining an optimal budget allocation for a first media channel associated with the first node, a second media channel associated with the second node, and a third media channel associated with the third node.

9. The method of claim 8, wherein determining the optimal budget allocation for the first media channel, the second media channel, and the third media channel comprises:

simulating data indicative of a plurality of budget allocation scenarios, wherein each budget allocation scenario is indicative of an amount of budget allocated to each of the first media channel, the second media channel, and the third media channel;

obtaining data indicative of user input of a target parameter;

for each respective budget allocation scenario of the plurality of budget allocation scenarios, determining a respective parameter for a respective budget allocation scenario of the plurality of budget allocation scenarios;

comparing each respective parameter and the target parameter;

determining that a first respective parameter associated with a first budget allocation scenario is within a threshold of the target parameter; and in response to determining that the first respective parameter is within the threshold of the target parameter, selecting the first budget allocation scenario as an optimal budget allocation scenario.

10. The method of claim 9, wherein the target parameter and each respective parameter associated with each respective budget allocation scenario are indicative of a percent reduction in cost per sale.

11. The method of claim 10, wherein the cost per sale is determined by calculating a media spend by the respective media channel divided by unit sales driven by the respective media channel.

12. The method of claim 9, wherein the target parameter and each respective parameter associated with each respective budget allocation scenario are indicative of an attribution associated with an effectiveness of the respective media channel and promotion usage on target actions.

13. The method of claim 12, wherein the attribution for the respective media channel is determined by calculating a unit sale driven by the respective media channel divided by overall sales.

14. The method of claim 9, wherein the target parameter and each respective parameter associated with each respective budget allocation scenario are an overall total media spend budget.

15. The method of claim 1, comprising:

generating data indicative of a graphical representation of the causal graph; and transmitting data comprising instructions that, when executed, cause the graphical representation of the causal graph to render via a graphical user interface of a user device.

16. The method of claim 1, comprising:

generating data indicative of a graphical representation of the determined allocation of resources to the plurality of media channels; and transmitting data comprising instructions that, when executed, cause the graphical representation of the allocation of resources to the plurality of media channels to render via a graphical user interface of a user device.

17. The method of claim 1, where the data associated with the plurality of media channels comprises outcome data, predictive variables, and control variables.

18. A computing system, comprising:

one or more processors; and one or more computer-readable media storing instructions that are executable to cause the one or more processors to perform operations, the operations comprising:

obtaining data associated with a plurality of media channels;

inputting the data into a machine learning model;

estimating, by the machine learning model, a structure of a causal graph comprising a Bayesian belief network (BBN) by:

performing structure learning to generate the causal graph comprising a plurality of nodes and a plurality of edges by calculating, by a random forest, a variable importance for the plurality of nodes to assist in refining the structure of the causal graph to favor an inclusion of a first set of relationships between a first set of the plurality of nodes and disfavor an inclusion of a second set of relationships between a second set of the plurality of nodes;

applying a second machine learning model to the causal graph to estimate one or more parameters associated with the causal graph;

determining an allocation of resources to the plurality of media channels based on the causal graph by:

generating a plurality of simulations for a plurality of budget allocation scenarios based on the causal graph comprising the BBN;

determining, for each respective simulation of the plurality of simulations, a parameter; and determining, based on the parameter for each respective simulation of the plurality of simulations compared to a target parameter, an optimal budget allocation; and allocating the resources to the plurality of media channels based on the determined resource allocation, wherein the resources comprise at least one of: network resources or computing resources.

19. One or more non-transitory computer readable media storing instructions that are executable by one or more processors to perform operations comprising:

obtaining data associated with a plurality of media channels;

inputting the data into a machine learning model;

estimating, by the machine learning model, a structure of a causal graph comprising a Bayesian belief network (BBN) by:

performing structure learning to generate the causal graph comprising a plurality of nodes and a plurality of edges by calculating, by a random forest, a variable importance for the plurality of nodes to assist in refining the structure of the causal graph to favor an inclusion of a first set of relationships between a first set of the plurality of nodes and disfavor an inclusion of a second set of relationships between a second set of the plurality of nodes;

applying a second machine learning model to the causal graph to estimate one or more parameters associated with the causal graph;

determining an allocation of resources to the plurality of media channels based on the causal graph by:

generating a plurality of simulations for a plurality of budget allocation scenarios based on the causal graph comprising the BBN;

determining, for each respective simulation of the plurality of simulations, a parameter; and determining, based on the parameter for each respective simulation of the plurality of simulations compared to a target parameter, an optimal budget allocation; and allocating the resources to the plurality of media channels based on the determined resource allocation, wherein the resources comprise at least one of: network resources or computing resources.

* * * * *